US012632022B2

(12) United States Patent
Paulin

(10) Patent No.: US 12,632,022 B2
(45) Date of Patent: May 19, 2026

(54) METHOD AND AUTOMATION SYSTEM FOR CONTROLLING AND/OR MONITORING A MACHINE AND/OR INSTALLATION

(71) Applicant: Lenze SE, Aerzen (DE)

(72) Inventor: Werner Paulin, Bremen (DE)

(73) Assignee: Lenze SE, Aerzen (DE)

( * ) Notice: Subject to any disclaimer, the term of this patent is extended or adjusted under 35 U.S.C. 154(b) by 1139 days.

(21) Appl. No.: 17/633,251

(22) PCT Filed: Aug. 6, 2020

(86) PCT No.: PCT/EP2020/072161
§ 371 (c)(1),
(2) Date: Aug. 31, 2022

(87) PCT Pub. No.: WO2021/023826
PCT Pub. Date: Feb. 11, 2021

(65) Prior Publication Data
US 2022/0413459 A1     Dec. 29, 2022

(30) Foreign Application Priority Data

Aug. 7, 2019    (DE) .......................... 102019121376.2

(51) Int. Cl.
*G05B 19/042*     (2006.01)
*G06F 9/54*     (2006.01)
*G06F 21/53*     (2013.01)

(52) U.S. Cl.
CPC ........... *G05B 19/042* (2013.01); *G06F 9/546* (2013.01); *G06F 21/53* (2013.01); *G05B 2219/25251* (2013.01)

(58) Field of Classification Search
CPC ........ G05B 19/042; G05B 2219/25251; G06F 9/546; G06F 21/53; G06F 9/4887
See application file for complete search history.

(56) References Cited

U.S. PATENT DOCUMENTS 11,226,605 B2 * 1/2022 Lo ...................... G05B 23/0289
2003/0204560 A1 10/2003 Chen et al.

FOREIGN PATENT DOCUMENTS

CN      105278940 A     1/2016
CN      109445959 A     3/2019
(Continued)

OTHER PUBLICATIONS

Chinese Office Action, Dated May 1, 2025 with English translation.
(Continued)

*Primary Examiner* — Zhipeng Wang
(74) *Attorney, Agent, or Firm* — Westborough IP Group, LLC

(57) ABSTRACT

Controlling and/or monitoring a machine or installation uses an automation system. Functions of the automation system are controlled by a computer. Control is provided by programs which are executed on the computer. The computer is equipped with a real-time-capable operating system, such as a real-time-capable Linux operating system. The programs include both real-time programs and non-real-time programs which are executed in a runtime environment that is superordinate to the real-time-capable operating system.

20 Claims, 4 Drawing Sheets

(56)                References Cited

FOREIGN PATENT DOCUMENTS

| EP | 1 103 890 | A2 | 5/2001 | | |
| EP | 2341405 | A2 * | 7/2011 | ......... | G05B 19/0421 |
| EP | 3 540 533 | A1 | 9/2019 | | |
| WO | WO 2012/019627 | A1 | 2/2002 | | |
| WO | WO 2018/087314 | A1 | 5/2018 | | |

OTHER PUBLICATIONS

Hua et al., "Research on a Real Time Robot Controller Based on RT-Linux", *Computer Engineering &Science* vol. 24 No. 6 (2002), 91-95.
European Office Action, Dated Jan. 23, 2024.
Anonymous: "Round-robin scheduling—Wikipedia", Aug. 3, 2019, pp. 1-4, XP093118182, URL:https://en.wikipedia.org/w/index/php?title=Roundrobin_scheduling&oldid=909199349 [retrieved on Jan. 11, 2024].
Karim Yaghmour et al., "Building Embedded Linux Systems. Second Edition", In: Building Embedded Linux Systems, O'Reilly (Aug. 25, 2008); ISBN: 978-0-596-52968-0. XP055496414.
Igor Kalkov et al., "Predictable Broadcasting of Parallel Intents in Real-Time Android", Java Technologies for Real-Time and Embedded Systems, ACM, 2 Penn Plaza, Suite 701 New York NY 10121-0701 USA (Oct. 13, 2014), pp. 57-66; DOI: 10.1 145/2661020. 2661023; ISBN: 978-1-4503-2813-5. XP058059159.
Julius Pfrommer et al., "Open Source OPC UA PubSub Over TSN for Realtime Industrial Communication", 2018 IEEE 23RD International Conference On Emerging Technologies and Factory Automation (ETFA), IEEE, vol. 1 (Sep. 4, 2018), pp. 1087-1090; DOI: 10.1109/ETFA.2018.8502479; XP033426010.
Anonymous. "Laufzeitumgebung - Wikipedia" (Jun. 27, 2019), Retrieved from the Internet: https://de.wikipedia.org/w/index.php?title=Laufzeitumgebung&oldid=189905227 [ret rieved on Nov. 3, 2020]; XP055746476, pp. 1-2 (Machine Translation).
Anonymous. "Real-time computing - Wikipedia" (Apr. 29, 2019), Retrieved from the Internet: https://en.wikipedia.org/w/index.php?title=Real-time_computing&oldid=894705181 [retrieved on Nov. 3, 2020]; XP055746443; pp. 1-3.
Betriebssystem (retrieved May 17, 2019) (Machine Translation).
Echtzeitbetriebssytem (retrieved May 17, 2019) (Machine Translation).
Echtzeitsystem (retrieved May 17, 2019) (Machine Translation).
Integrierte Entwicklungsumgebung (retrieved May 20, 2019) (Machine Translation).
Kernel (Betriebssystem) retrieved May 2019) (Machine Translation).
Laufzeit (Informatik) (retrieved May 17, 2019) (Machine Translation).
Liste von integrierten Entwicklungsumgebungen (retrieved May 20, 2019) (Machine Translation).
Message Oriented Middleware (retrieved May 19, 2019) (Machine Translation).
Message passing (retrieved May 17, 2019).
Message pattern (retrieved May 17, 2019).
Nachrichtenaustausch (retrieved May 19, 2019) (Machine Translation).
OPC Unified Architecture (retrieved May 17, 2019) (Machine Translation).
Publish-subscribe pattern (retrieved May 17, 2019).
Sandbox (retrieved May 17, 2019) (Machine Translation).
Scheduling (retrieved May 17, 2019) (Machine Translation).
Serviceorientierte Architektur (retrieved May 17, 2019) (Machine Translation).
Sarah Schneider, Grundlagen der Realzeitprogrammierung (retrieved May 17, 2019) (Machine Translation).

* cited by examiner

Fig. 1, SdT

PRIOR ART

METHOD AND AUTOMATION SYSTEM FOR CONTROLLING AND/OR MONITORING A MACHINE AND/OR INSTALLATION

TECHNICAL FIELD

The system described herein relates to controlling and/or monitoring a machine or installation via an automation system and an automation system for controlling and/or monitoring a machine and/or installation.

BACKGROUND

As the automation of technical processes increases, the complexity of control and/or monitoring functions which must run as intended and as independently as possible from active participation by humans has also continued to increase. DIN IV 19233 defines automation as equipping an installation in such a manner that the installation works as intended and fully or partially without human participation.

In particular with respect to complex automation functions, computers offer major potential. This potential is based, in particular, on the fact that a computer can be comparatively freely programmed. Generally, in this case, an operating system constitutes an interface between the computer hardware and the computer programs that generally do not access the computer hardware directly, but instead access functions provided by the operating system. This results in the programs being decoupled from the computer hardware, i.e. the software developer does not have to deal with the particularities of the hardware and instead only has to design the software to be compatible with the respective operating system. This has resulted in an enormous pool of software that is compatible with commercial operating systems or widely-distributed, freely-available operating systems, hence programs that can run on the respective operating system being available.

The operating systems generally used on computers, like servers, clients, desktop computers, portable computers, etc. are usually not, however, real-time capable. For most applications used on such computers, this is not necessary anyway. One component of the operating system handles resource allocation. This component of an operating system is generally called a "scheduler". Such an operating system can also have several such schedulers which manage the computer's various resources. Schedulers manage processes and execution of the processes in this context. For instance, scheduling procedures based on time slices and/or priorities can be used. The schedulers define, in particular, the order in which the individual programs can access the respective hardware resource. The respective hardware resource may be a processor, a processor core, memory, a hard drive, a network card's input/output buffer, etc.

Such computers with conventional operating systems, however, can only be used to a limited extent for automation functions because operating systems distributed outside automation technology are generally not able to meet the real-time requirements of programs executed on the operating system in conjunction with automation systems. Programs from the field of automation technology, however, often present real-time requirements, for instance, because a specific program actuates a specific actuator for control purposes. If the actuator receives a control command too late and, accordingly, activates too late, this can have a fatal effect on the ongoing operation of a machine or installation. Therefore, several technical solutions have been developed in the field of automation technology. Often the solutions are real-time operating systems that run on embedded computers in programmable logic controllers. Such real-time operating systems are, however, generally highly specialized and are also largely proprietary systems for which practically no software is available except for the programs for the automation function. This pertains, in particular, to typical standard software as is available for standard operating systems like Windows or Linux. Programs written for standard operating systems usually will not run on proprietary systems. An additional incompatibility arises because proprietary libraries are often used on proprietary systems with operating system calls that are also proprietary. The expense and effort that would be required to provide "standard software" for each special type of such a proprietary system is simply too great so, in practice, only a very limited pool of software is available for proprietary systems.

The software architecture of such real-time systems is also optimized to process appropriately programmed real-time programs. Programs written for non-cyclical, event-oriented operation cannot be processed by such systems, or can only be processed with difficulty. This pertains, in particular, to situations in which real-time and non-real-time programs share resources.

Approaches have been established to combine the functions of conventional, non-realtime-capable computers with the options of the real-time systems from automation technology. For instance, a so-called hypervisor is implemented as an intermediate layer between the computer hardware and the operating system. In such an architecture, a realtime-capable and a non-real-time-capable operating system can be operated in parallel. The hypervisor ensures that the hardware resources are distributed by continuously "switching back and forth" between the operating systems.

The disadvantage of using such a hypervisor is, however, that hypervisors are highly hardware-specific. If such a hypervisor is used, for instance, for a specific programmable logic controller, the hypervisor must always be adapted to the respective hardware. This results in the undesirable dependency between the hardware, on one hand, and the software between the hardware and the hypervisor, on the other hand.

Moreover, the hypervisor implements a strict separation of the real-time-capable operating system and the non-real-time-capable operating system. Communication between programs that run on the real-time-capable operating system and programs that run on the non-real-time-capable operating system is therefore significantly more difficult.

The systems created in this manner are therefore often highly specialized and only available for or compatible with specific hardware. The benefit of the computer technology described above, namely the "openness" of the system with respect to expanding the system with new programs and the arising independency of the hardware used, no longer apply as a result or disrupt the real-time capability.

As a makeshift solution, a conventional and "open", real-time-capable operating system or one that has been made real-time-capable by way of suitable add-ons is often used. This can, for instance, be a Linux system. To establish the "openness" of the system, meaning, in order to offer the user options to adjust the functionality of the system to their needs, the user is often granted the option to access the system with so-called "root privileges", i.e. the user can make extensive changes to the system.

The use of root privileges results in major disadvantages. On the one hand, using root privileges creates a huge security gap because root privilege grants extensive rights. Moreover, the real-time behavior can be destabilized because individual packets utilize resources, for instance, memory and computing time, in an uncontrolled manner. In addition, the necessary knowledge to make such changes to an operating system so close to the kernel is not widely available, so the user can only make such changes with great effort and expense and creating risks arising from errors while making these changes. The life cycle management of the software (updates, security patches, etc.) is also made more difficult or practically impossible by such changes. Finally, such a system merely constitutes a coexistence of real-time programs and non-real-time programs. However, there is no coordination of real-time and non-real-time elements, in particular, to allow for stable real-time operation while simultaneously operating non-real-time programs.

SUMMARY OF THE INVENTION

The system described herein provides a method and an automation system in which the above disadvantages do not occur or at least occur to a lesser extent only.

The system described herein provides for the functions of the automation system being controlled via a computer. The control function is executed by programs that are executed on the computer. To this end, the computer is equipped with a real-time operating system. The real-time operating system may be, in particular, a real-time-capable Linux operating system. Such an operating system, Linux with a corresponding add-on for real-time capability (preemptive RT patch or PREEMPT_RT patch), is, in particular, known under the designation "Linux RT". The system described herein provides for the programs, which include both real-time programs and non-real-time programs, being executed in a real-time environment that is superordinate to the operating system. It has been shown that using such a real-time environment, in particular, as a layer between the programs and the operating system in which the software architecture on which the system is based, allows for the simultaneous execution of real-time and non-real-time programs, which ensures the system described herein is highly stable and secure. Moreover, a higher degree of modularity can be achieved on the software level to adapt and/or expand the software used to execute the system described herein.

In particular, the resources of the computer are allocated in such a manner that ensures that the real-time programs have adequate resources to fulfill the respective real-time requirements. In particular, the runtime environment defines the priority order in which the programs are processed. In particular, the runtime environment assigns cyclical time slices to the real-time programs which are processed in real time. In particular, the runtime environment determines suitable points in time at which the non-real-time applications can be processed without negatively impacting the real-time processing of real-time programs. The runtime environment transfers the programs, in particular with instructions concerning priority of processing, to the operating system for processing. In particular, the runtime environment ensures that the execution of the real-time programs in accordance with the respective real-time requirements is not negatively impacted by the non-real-time programs.

In particular, the programs are executed in sandboxes. Preferably, each program is executed in its own sandbox. Execution in sandboxes means that the respective program is shielded from the rest of the system. This prevents errors while executing a single program, for instance, an illegal operation like dividing by zero, unauthorized memory access, a stack error, etc. from having a negative impact on the overall system or other programs. This is particularly significant with respect to the real-time requirements that have to be met.

It is possible for each program to be executed in its own sandbox. Alternatively and/or in addition, multiple programs can be executed in a shared sandbox. The runtime environment can assign the programs to the sandboxes based on defined conditions. The defined conditions may include, in particular, memory requirements, computing power requirements and/or real-time behavior.

In particular, execution in a sandbox means that programs do not use any shared or global variables. This prevents the incorrect use of the shared or global variables by a program from having a negative impact on the execution of another program.

Moreover, execution in a sandbox means, in particular, that no programs access shared memory ranges. This pertains, in particular, to the use of the working memory.

Moreover, the method can provide that the programs do not access shared program components. The shared program components may include, in particular, software libraries. Such a shared program component results in a dependency among the programs. The use of such a shared program component provides the benefit that the program component only has to be saved on the relevant computer once, where the program component can then be accessed by all of the programs that use the shared program component; the disadvantage, however, is that version changes to one program that may also require that the version of the shared program component be changed, which can result in incompatibility with a program that also uses the shared program component. Avoiding shared program components ensures a modularity that allows the replacement of individual programs without impacting other programs. It is also possible, in principle, for different programs to use identical program components. The identical program components are then, however, saved on a separate, non-volatile data storage medium in particular for each program that utilizes the respective program component. In other words, this means that several copies of program components used by a plurality of programs are saved on a non-volatile storage medium. In particular, only one specific program accesses each copy of the program component. Each program that utilizes a program component merely accesses a private copy of the respective program component. In other words, programs do not access the same memory range of a non-volatile storage medium, in particular not for using shared program components by multiple programs.

In particular, the runtime environment can prevent the programs from executing root accesses. This increases system security. Moreover, the runtime environment can monitor, prevent and/or grant all accesses of the programs to the functions of the real-time-capable operating system that is subordinate to the runtime environment. Moreover, the runtime environment can, in particular, control, monitor, prevent and/or allow the communication of the programs among each other and/or with destination devices outside the runtime environment, for instance, peripheral devices. This increases system security. In particular, attacks by malware "secretly" introduced into the system in individual programs can be made more difficult or even prevented.

In particular, the runtime environment controls the communication of the programs among each other. The programs communicate with each other via a message passing system. The runtime environment assumes, in particular, the role of messenger-oriented middleware or provides such middleware for the programs. The controlled communication of the programs among each other allows the runtime environment to ensure that the individual programs, in particular those executed in their own sandboxes, do not negatively impact each other. This can also ensure a high level of security and modularity of the system. The communication of the programs among each other by way of message passing allows, in particular, for individual programs to be executed largely independently of each other. Moreover, programs can be expanded, updated, added and/or removed independently of each other. This improves the modularity of the automation system, in particular, on the software level. Message passing thus allows, for instance, a time delay between the dispatch and receipt of the message. If, for instance, a function of another program is called up by a program, the program can "wait" for the response from the other program for a comparatively longer period. This increases flexibility when allocating the resources to the respective programs running in the individual sandboxes. Moreover, only the contents of the "message" have to be understood by the recipient. In particular, the individual programs executed in the runtime environment do not directly call up the functions of other programs executed in the runtime environment and/or do not access the memory allocated to other programs. This improves the independence of the programs among each other and thus the modularity of the automation system's software.

The programs can communicate with each other, in particular, based on a publish-subscribe messaging pattern. The major benefit of such a publish-subscribe messaging pattern is that the sender does not have to identify the recipient(s) of the message. On the other hand, for instance, in comparison to a broadcast or a message distribution system in which the message would ultimately be forwarded to all possible recipients, the publish-subscribe messaging pattern reduces the system load because the individual "messages" are only received by the addressees to whom the respective "message" is directed (subscribers).

Alternatively and/or in addition, another communication structure, for instance OPC UA, can be used for the communication of the programs among each other.

Advantageously, a nano-messaging system like e.g. NanoMSG NNG can be used for the communication of the programs among each other. This is advantageous, in particular, with respect to the comparatively low system resource requirements for nano-messaging systems. The benefit of OPC UA is that OPC UA is a uniform, cross-manufacturer and open standard.

Moreover, the system described herein can provide for the communication between the programs and peripheral devices, for instance, actuators or sensors. The communication can, for instance, be executed via a service-oriented communications structure. This can, for instance, be OPC UA. In particular, a real-time capable version of OPC UA, e.g. the OPC UA-TSN version, can be used. The communication between the programs and peripheral devices is controlled, in particular, by the runtime environment. The runtime environment executes, in particular, the mediation of the communication between the individual programs and the operating system. The operating system handles in particular the mediation of the communication between the runtime environment and the hardware.

It is possible for a computer system to provide programs that can be executed in the runtime environment, via a data connection. This allows for new programs, for instance, to be easily transferred, for example via the Internet, to the computer being used to execute the system described herein and to expand the usage options. The programs can, for instance, be provided by the computer system in the manner of a software store.

The system described herein can provide for an integrated development environment being provided that supports the creation of programs that can be executed in the runtime environment.

The system described herein can provide for the programs being managed, in particular by the runtime environment. This pertains, in particular, to programs that are provided by a computer system via a data connection. The runtime environment can, in particular, provide a packet management function that manages software packets that contain the relevant programs. The programs and/or software packets are received, in particular, by the runtime environment, in particular, the packet management function, from a computer system via a data connection and/or a development environment. In particular, the runtime environment, in particular the packet management function, assigns sandboxes to the programs. In particular, the runtime environment, in particular, the packet management function, can start the processing of the programs. The programs are received by the packet management function, in particular, in an executable state, where in particular the programs are received as packets that contain both the executable program code and the configuration data and/or libraries. The programs are saved, in particular, on a data storage medium of the computer in such a manner that both the program code and the configuration data of the program are stored separately from other software on the data storage medium.

The real-time programs may be, in particular, programs to control an electrical drive system and/or multiple electrical drive systems. Electrical drive systems are typical components of machines and/or installations, controlling which is subject to comparatively high real-time capability requirements due to the high working speed of modern machines and/or installations. On the other hand, highly-automated machines and/or installations generally require a precise coordination of the movements of multiple (or even a plurality) of driven axes.

Accordingly, at least one of the real-time programs can control the movement, movement speed and/or position of an electrical drive system. The control function can be executed, in particular, by a frequency converter of the drive system actuated by the computer. The movement speed may be, in particular, a rotational speed and/or an angular speed of a drive axis of the drive system. The position may be, in particular, an angular position to be assumed by an axis of the drive system and/or, specifically, an angular range to be traveled during the movement by rotating an axis of the drive system.

Alternatively and/or in addition, at least one of the real-time programs can coordinate the positions, movements and/or movement speeds of multiple axes driven by electrical drive systems. This may include axes on the same machine and/or installation.

Alternatively and/or in addition, it is also conceivable that at least one of the real-time programs can coordinate the positions, movements and/or movement speeds of the driven axes of various machines and/or installations. For instance, a scenario in which a robot picks up workpieces from a conveyor belt and places the workpieces at specific positions is conceivable. In such a case, a program can coordinate the movements of the driven axes of the conveyor belt and the movements of the driven axes of the robot with each other.

It is evident that, alternatively and/or in addition, in principle, at least one of the real-time programs can actuate positions, movements and/or movement speeds of at least one axis driven by an electrical drive system, taking into account at least one peripheral device of any kind, in particular, the system described herein can coordinate the actuation of positions, movements and/or movement speeds with an action of an actuator and/or can actuate positions, movements and/or movement speeds depending on a signal from a sensor.

The automation system for a machine or installation, which is designed in particular to provide the functionality described herein, is equipped with multiple peripheral devices connected to a computer via data connections. The peripheral devices may be, in particular, all kinds of field devices, specifically, sensors and/or actuators. The peripheral devices are used to execute automation functions like the drive functions of a motor, in particular acceleration and deceleration. The peripheral device in this case may be a motor controller, for instance, using a frequency converter. The peripheral devices can, however, also be any other kind of sensor and/or actuator used to realize a positioning profile of a pick-and-place robot, for instance, a robot with Delta kinematics. The automation functions may also be tracking management functions, for instance, the visual tracking of workpieces. In this context, the peripheral device may be, for instance, a camera. The computer is equipped with a real-time-capable operating system, specifically, a real-time-capable Linux operating system. Moreover, the automation system is equipped with programs to control the execution of the automation functions by the peripheral devices which can be executable in a runtime environment that is superordinate to the operating system. The programs include both real-time programs and non-real-time programs.

The automation system may include identification modules that can be connected to the computer via a data connection and which identify programs required for a specific machine, installation and/or a specific peripheral device. Thus, the identification modules can, for instance, have memory modules in which instructions are stored that cause a specific program to initially be downloaded from a computer system via a data connection and then executed in the runtime environment. This way, a kind of "plug-and-play" functionality can be realized with which merely an identification of the required software has to be executed by identification modules. The identification modules are assigned to the machine, installation and/or the peripheral device. In particular, the identification modules are integral components of the machine, installation and/or the peripheral device. If the installation, machine and/or peripheral device is integrated into the automation system via a data line, in this context in particular, the respective identification module is also integrated into the automation system. Integration via the data line enables, in particular, communication between the runtime environment and the identification module.

Alternatively and/or in addition, programs and/or configuration files can be integrated into the memory modules of the identification modules which programs and/or files, in particular, are specific to the respective machine, installation and/or the respective peripheral device. With this variant, the machine, installation and/or the peripheral device, if integrated into the automation system, delivers the software required to operate the machine, system and/or the peripheral device directly to the runtime environment. It is evident that mixed forms with respect to the design of the identification modules described above are possible. For instance, a "basic version" of the software can be provided and a data connection can be used by a computer system to, if needed, download updates and/or expansions that are provided, for instance, at a later date, via a data connection.

The automation system may include peripheral devices of multiple machines. The benefit of the automation system in this context is, in particular, that the system is scalable. As long as sufficient resources are available on the computer to ensure smooth processing of the real-time programs in particular, in theory, any number of peripheral devices of any number of machines and/or installations can be controlled and/or monitored by a computer. Further, the allocation between the computers and the machines, installations and/or peripheral devices is flexible, i.e. the allocation can be modified with little effort; for instance, a computer can be subsequently assigned additional machines, installations and/or peripheral devices which can then also be controlled and/or monitored by the computer. Likewise, a machine, installation and/or peripheral device that is controlled and/or monitored by a first computer can be subsequently assigned to another computer, instead of the first computer, via which the machine, installation and/or this peripheral device is then controlled and/or monitored. This is an improvement to the current state-of-the-art, in which a corresponding control and/or monitoring unit like a programmable logic controller, is permanently assigned to a machine, installation and/or peripheral device and the assignment is rarely changed subsequently or is only changed with great expense and effort.

Since the computer only has to be compatible with the operating system that is subordinate to the runtime environment, comparatively cost-effective standard hardware like an industrial PC or even a conventional PC can be used as the computer. A corresponding large number of peripheral devices can be automated and thus the automation of large, complex production installations can also be controlled and/or monitored from a single central computer. If the resources of a computer are not sufficient, multiple computers can be used to, for instance, control a complex production process, like an entire factory. Individual installations and/or machines or their peripheral devices to be connected to the computer can be distributed to the computers so the individual computers can be utilized sensibly with respect to the required resources. The current standard of using a number of local control units is no longer required when using the system described herein, which results in cost savings, in particular, due to the simplified maintenance of the entire system and the costs can thus be reduced across the life cycle.

BRIEF DESCRIPTION OF DRAWINGS

Further practical embodiments and benefits of the system described herein are described in the following in conjunction with the drawings. The figures show the following.

DETAILED DESCRIPTION OF VARIOUS EMBODIMENTS

Figure 1:
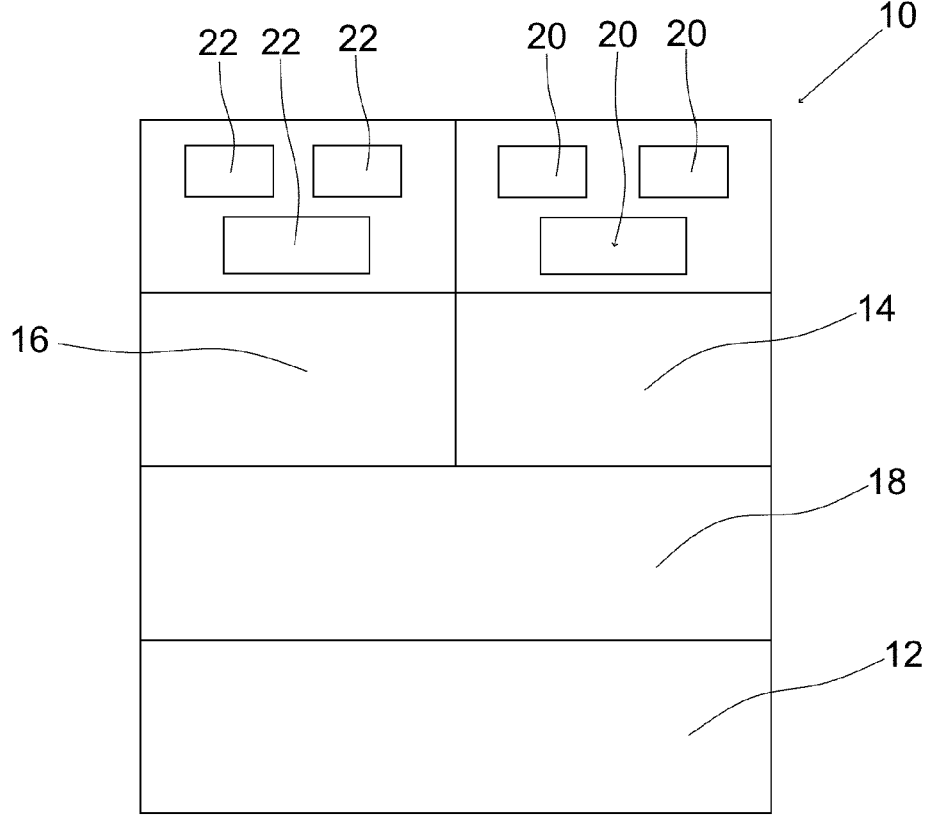
FIG. 1 a schematic diagram of a software architecture of a computer of a conventional automation system, FIG. 2 a schematic diagram of the software architecture of a computer of an exemplary automation system according to the system described herein, FIG. 3 a schematic diagram of the operating principle of a sample automation system according to the system described herein, FIG. 4 the operating principle of an exemplary automation system according to the system described herein to control and/or monitor multiple machines and/or installations.

A software architecture of a computer 10 of a conventional automation system is shown as an example in FIG. 1. A hypervisor 18 is provided for as an additional layer of the software architecture, between the hardware layer 12 and a layer which is formed by a realtime-capable operating system 14 and a non-real-time-capable operating system 16. By continuously "switching back and forth", the hypervisor 18 ensures that the hardware 12 resources are distributed between the real-time-capable operating system 14 and the non-real-time-capable operating system 16.

Commercial operating systems like Windows or Linux can be used as the non-real-time-capable operating system 16 in such a software architecture. The real-time-capable operating system 14 is generally a specialized operating system which allows for the real-time programs 20 to be processed on the application layer that is superimposed on the realtime-capable operating system 14. Accordingly, the non-real-time-capable operating system 16 allows for the execution of non-real-time programs 22 which, as a result, can be executed with the real-time programs 20 on the same computer 10.

The hypervisor 18 provides the hardware 12 of the computer 10 to one of the systems as needed; from a perspective of a user at least, the usability of the computer 10 appears simultaneous for real-time programs 20 which, in particular, can be used to control and/or monitor a machine and/or an installation, and non-real-time programs 22 which may be, for instance, CAD applications, programs to generate documents like PDF generators, programs for documentation, like an electronic machine or system log. In particular, the non-real-time applications 22 are typically available for commercial, non-real-time-capable operating systems like Windows. The use of a hypervisor 18 thus allows for such software to be easily integrated into the otherwise highly-specialized infrastructure of the conventional programmable logic controllers according to the state-of-the-art. There is, however, still a high level of dependency with respect to the compatibility of the hardware 12 with the hypervisor 18. In addition, there are the disadvantages described above, which arise from the comparatively strict separation of the real-time-capable operating system 14 from the non-real-time-capable operating system 16.

Figure 2:
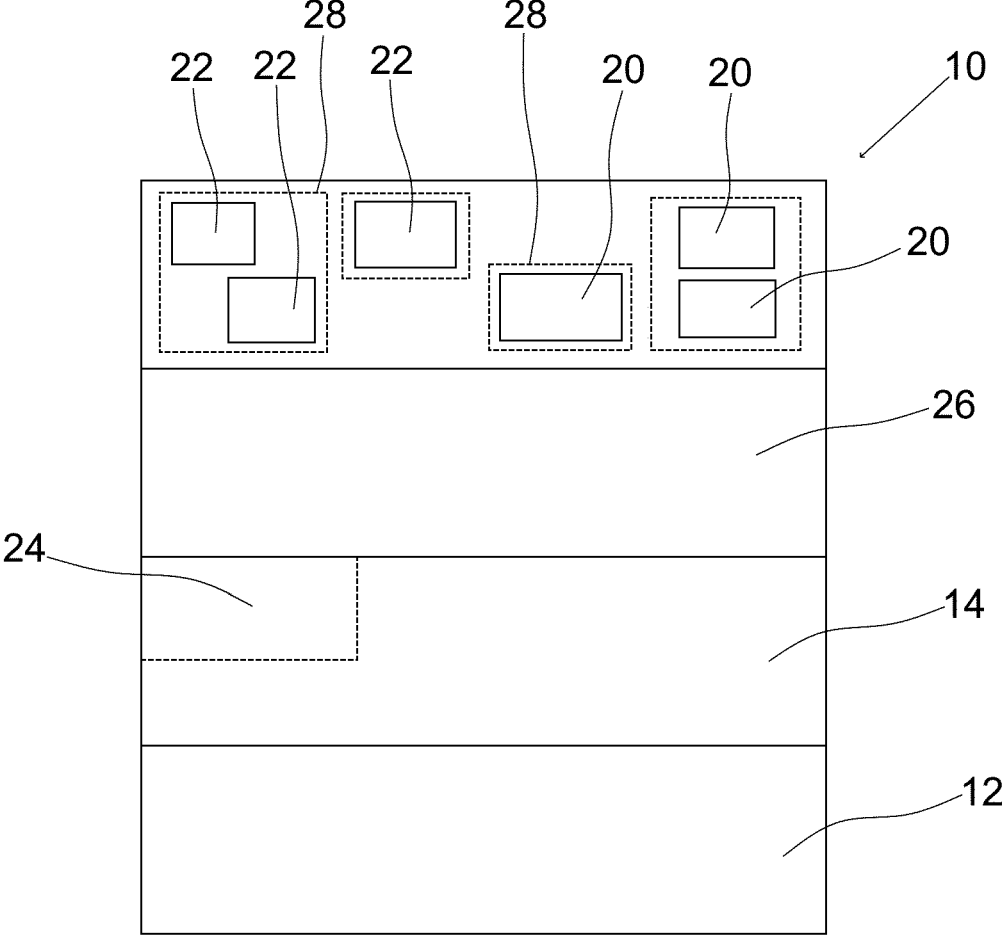

An exemplary software architecture of the computer 10 of an exemplary automation system according to the system described herein is schematically illustrated in FIG. 2. In this architecture, the hardware 12 of the computer 10 also constitutes a lowest layer. The real-time-capable operating system 14 is superimposed on the lowest layer. This real-time-capable operating system 14 may be, in particular, a Linux operating system which, for instance, is equipped with the required real-time capability by way of a suitable add-on 24 (for instance a "PREEMPT_RT patch"). A runtime environment 26 is superimposed on the real-time-capable operating system 14 layer. The runtime environment 26 constitutes a link between the application layer, with the real-time programs 20 and the non-real-time programs 22, and the real-time-capable operating system 14. The real-time programs 20 and the non-real-time programs 22 are executed in the runtime environment 26.

While controlling and/or monitoring an automation system of a machine and/or installation is being executed, the computer 10 executes functions of the automation system via the programs 20, 22, in particular, via the real-time programs 20.

Resources of the computer 10, in particular the hardware 12, are allocated in particular in a manner that ensures that the real-time programs 20 have sufficient resources to fulfill the respective real-time requirements. In particular, the runtime environment 26 defines the priority order in which the programs 20, 22 are processed.

In particular the real-time programs 20 and the non-real-time programs 22 are executed in sandboxes 28. It is possible to execute each of the programs 20, 22 in a private portion of the sandbox 28. However, some of the programs 20, 22 may also be executed in a shared portion of the sandbox 28.

Figure 3:
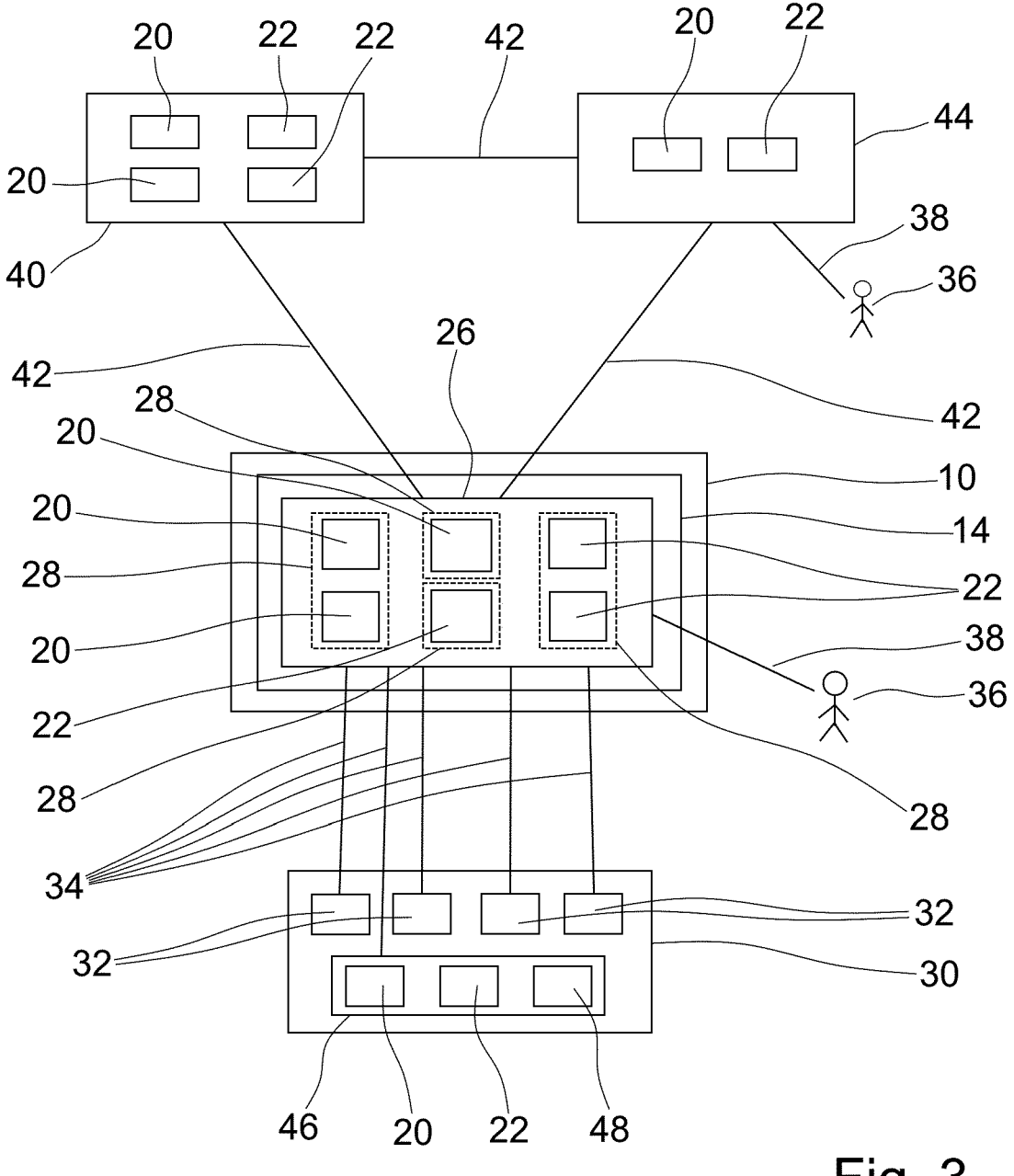

An exemplary automation system for a machine and/or installation 30 is shown in FIG. 3. The automation system is comprised of the computer 10 with the real-time-capable operating system 14 on which, in turn, the runtime environment 26 is superimposed.

Peripheral devices 32 are connected to the computer 10 via data connections 34. The data connections 34 allow for communication between the programs 20, 22 on the one hand and the peripheral devices 32 on the other. The peripheral devices 32 are, in particular, field devices like actuators and/or sensors. For instance, the peripheral devices 32 may be electrical drives that are supplied with electrical energy and actuated, in particular, via frequency converters. The communication can be executed via the data connections according to the OPC UA specification. The communication between the programs 20, 22 on the one hand, and the peripheral devices 32 on the other, is controlled, in particular, by the runtime environment 26.

The system described herein can allow for communication with a user 36 via a user interface 38. The user interface 38 can, in particular, include data input and/or data output devices like a screen, printer, keyboard and/or pointer device like a mouse and/or a touchscreen. The user interface 38 constitutes a component of the hardware 12 in this case. In this manner, the user 36 is able to actively influence the automation system and, in particular, directly influence controlling and/or monitoring the automation system via the computer 10.

The programs 20, 22 can be provided by a computer system 40 via data connections 42. The programs 20, 22 are provided in particular in the manner of a software store from which the programs 20, 22 can be called up or downloaded by the runtime environment 26 via the data connections 42. In this context, the runtime environment 26 can, in particular, be equipped with a suitable packet management function via which the installation of the programs on the computer 10 is controlled by the runtime environment 26.

Alternatively and/or in addition, an integrated development environment 44 can be provided which allows the user 36 to create and/or modify the programs 20, 22 via the user interface 38. The integrated development environment 44 can, in particular, be provided spatially separated from the computer 10 and/or the computer system 40. As a result, the user environment 44 may be software that is executed on any other computer. This allows the users 36 in a convenient manner to provide new versions of the programs 20, 22 for the operation of the automation system, for instance, from a development engineer's offices. The data connections 42 can connect the integrated development environment to the computer 10 and/or a computer system 40, for instance, via the Internet and/or an Intranet.

Moreover, it is possible for the machine and/or installation 30 to be equipped with an identification module 46, which is, in particular, also connected to the computer 10 via the data connection 34. The data connection 34 between the computer 10 and the identification module 46 is also controlled, in particular, by the runtime environment 26. The identification module 46 may contain suitable data storage media with stored real-time programs 20, non-real-time programs 22 and/or data 48 relevant to the installation and/or machine. This allows the computer 10 to identify the machine and/or installation 30. The programs 20, 22 required for the method for controlling and/or monitoring the automation system of the machine and/or installation 30 can then, for instance, be downloaded via a data connection 42 separated from a computer system 40. Alternatively and/or in addition, the programs can also be provided via the identification module 46 of the machine and/or installation 30 already. In this manner, after establishing the data connections 34 between the components of the automation system assigned to the machine and/or installation 30 and the computer 10, the automation system can be commissioned according to the plug-and-play principle.

Figure 4:
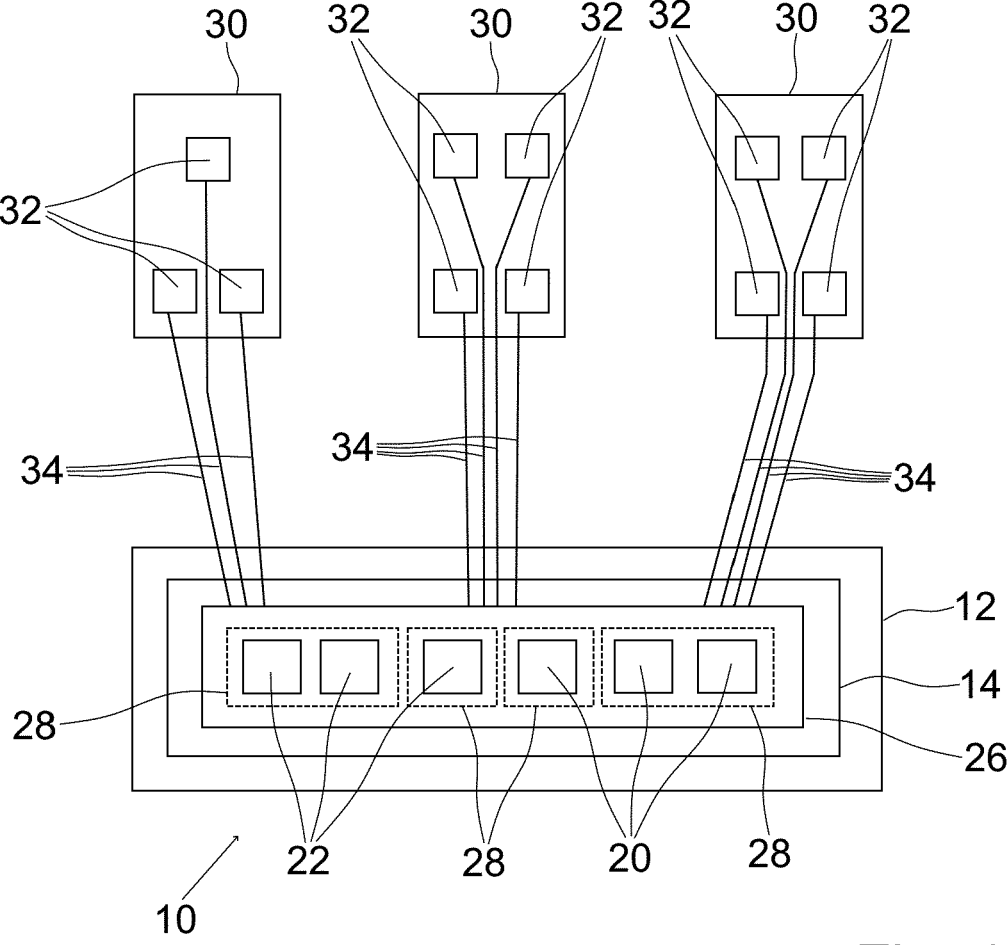

Such an automation system is highly variable. Thus, as shown as an example in FIG. 4, automation systems can be realized that include peripheral devices 32 of multiple machines and/or installations 30. The peripheral devices 32 can all be connected to the single computer 10; an automation system designed in this manner can be adapted in a beneficial manner to modified requirements, in particular, the individual programs 20, 22 can be easily added, replaced and/or updated. The replacement of the hardware 12 of the computer 10 is comparatively easy because the runtime environment 26 allows for the use of widely-distributed, real-time-capable operating systems like a Linux operating system. This results in a high level of flexibility when selecting the hardware 12 of the computer 10. It is also comparatively easy to subsequently integrate the peripheral devices 32, and thus the additional machines and/or installations 30 into the automation system or remove and/or replace thus the additional machines and/or installations 30. Due to the resulting modularity of the system, the life cycle costs of such an automation system can be reduced in comparison to conventional solutions in which such modifications are comparatively difficult to implement.

The features of the invention disclosed in this description, in the drawings and in the claims can be relevant, both individually and in any combination, to the realization of the invention in its various embodiments. The invention is not limited to the described embodiments. It can be varied in the framework of the claims and taking into account the knowledge of the competent person skilled in the art.

The invention claimed is:

1. A method of controlling and/or monitoring an automation system of a machine and/or system using a computer, comprising:
   providing the computer with a real-time-capable operating system;
   executing programs on the computer that control and/or monitor the automation system of a machine and/or system and that include real-time programs and non-real-time programs; and
   determining suitable points in time at which the non-real-time programs can be processed without negatively impacting real-time processing of the real-time programs by executing the programs in a runtime environment that is superordinate to the operating system and that transfers the programs to the operating system with instructions concerning priority of processing to ensure that real-time processing requirements of the real-time programs are not negatively impacted.

2. The method according to claim 1, wherein the resources of the computer are allocated to ensure that the real-time programs have adequate resources to meet the respective real-time requirements.

3. The method according to claim 1, wherein the programs are executed in sandboxes.

4. The method according to claim 1, wherein the programs communicate with each other via a message passing system.

5. The method according to claim 1, wherein the programs communicate with peripheral devices to execute control functions.

6. The method according to claim 1, wherein ones of the programs that can be executed in the runtime environment are provided by a computer system via data connection.

7. The method according to claim 1, wherein an integrated development environment is provided that supports creation of programs that can be executed in the runtime environment.

8. The method according to claim 1, wherein multiple copies of program components that are used by different ones of the programs are stored on a non-volatile storage medium.

9. The method according claim 1, wherein at least one of the real-time programs controls at least one of: movement, movement speed or position of an electrical drive system.

10. The method according to claim 1, wherein at least one of the real-time programs coordinates at least one of: positions, movements or movement speeds of multiple axes driven by electrical drive systems.

11. An automation system to control and/or monitor a machine and/or system, comprising:
   a computer;
   multiple peripheral devices, connected to the computer via data connections, to execute automation functions;
   a real-time-capable operating system provided on the computer;
   real-time programs and non-real-time programs provided on the computer that control execution of the automation functions by the peripheral devices, wherein the programs can be executed in a runtime environment that is superordinate to the operating system and that determines suitable points in time at which the non-real-time programs can be processed without negatively impacting real-time processing of the real-time programs and that transfers the programs to the operating system with instructions concerning priority of processing to ensure that real-time processing requirements of the real-time programs are not negatively impacted.

12. The automation system according to claim 11, wherein the automation system includes identification modules that can be connected to the computer via a data connection to identify and/or provide the programs.

13. The automation system according to claim 11, wherein the peripheral devices are peripheral devices of multiple machines.

14. The method according to claim 1, wherein the real-time-capable operating system is a real-time-capable Linux operating system.

15. The method according to claim 2, wherein the real-time programs are classified into cyclical time slices.

16. The method according to claim 3, wherein each of the programs is executed in a separate sandbox.

17. The method according to claim 4, wherein the message passing system uses a publish-subscribe message pattern.

18. The method according to claim 5, wherein the programs communicate with the peripheral devices via a service-oriented communications structure.

19. The method according to claim 18, wherein the service-oriented communications structure is according to an OPC UA specification.

20. The method according to claim 8, wherein each copy of each of the program components is only accessed by a specific one of the programs.

* * * * *